(12) United States Patent
Kuo

(10) Patent No.: US 8,578,655 B2
(45) Date of Patent: Nov. 12, 2013

(54) DOOR STRUCTURE WITH EASY ASSEMBLY

(75) Inventor: Yu-Ling Kuo, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/338,215

(22) Filed: Dec. 27, 2011

(65) Prior Publication Data

US 2012/0233928 A1    Sep. 20, 2012

(30) Foreign Application Priority Data

Mar. 14, 2011  (TW) .................................. 100108502

(51) Int. Cl.
*E06B 3/70*    (2006.01)

(52) U.S. Cl.
USPC ............................ 49/460; 312/223.2; 312/326

(58) Field of Classification Search
USPC ........... 49/460, 501, 400, 401, 402; 16/110.1, 16/412, 413, 422, 425, 426, 431, 436, 16/DIG. 24; 312/223.2, 326–329, 405.1
See application file for complete search history.

(56) References Cited

U.S. PATENT DOCUMENTS

| | | | | |
|---|---|---|---|---|
| 4,087,141 A * | 5/1978 | Roberts | | 312/348.6 |
| 5,402,553 A * | 4/1995 | Goetz et al. | | 16/413 |
| 5,440,783 A * | 8/1995 | Allardyce et al. | | 16/110.1 |
| 5,788,347 A * | 8/1998 | Rabinovitz | | 312/111 |
| 6,181,549 B1 * | 1/2001 | Mills et al. | | 361/679.59 |
| 6,220,680 B1 * | 4/2001 | Chen | | 312/223.2 |
| 6,231,144 B1 * | 5/2001 | Chen et al. | | 312/332.1 |
| 6,373,695 B1 * | 4/2002 | Cheng | | 361/679.39 |
| 6,407,913 B1 * | 6/2002 | Peachey et al. | | 361/679.57 |
| 6,542,356 B2 * | 4/2003 | Gan | | 361/679.58 |
| 6,578,236 B2 * | 6/2003 | Munari | | 16/444 |
| 6,594,861 B2 * | 7/2003 | Dimig et al. | | 16/412 |
| 6,608,750 B2 * | 8/2003 | Cruz et al. | | 361/679.33 |
| 6,757,163 B2 * | 6/2004 | Jeong | | 361/679.32 |
| 6,762,934 B2 * | 7/2004 | Kitchen et al. | | 361/679.58 |
| 6,769,154 B1 * | 8/2004 | Klein et al. | | 16/412 |
| 6,775,144 B2 * | 8/2004 | Gan et al. | | 361/727 |
| 6,940,731 B2 * | 9/2005 | Davis et al. | | 361/801 |
| 7,082,036 B2 * | 7/2006 | Cheng et al. | | 361/726 |
| 7,110,251 B2 * | 9/2006 | Wu | | 361/679.32 |
| 7,586,740 B2 * | 9/2009 | Tang | | 361/679.27 |
| 7,781,675 B2 * | 8/2010 | Adducci et al. | | 174/50 |
| 7,793,388 B2 * | 9/2010 | Wing | | 16/412 |
| 7,795,532 B2 * | 9/2010 | Walker | | 174/50 |
| 2006/0034045 A1 * | 2/2006 | Wang | | 361/683 |

(Continued)

OTHER PUBLICATIONS

Office action mailed on Jul. 24, 2013 for the Taiwan application No. 100108502, filing date: Mar. 14, 2011, p. 1 line 12~14, p. 2 line 1~15, line 18~22 and line 24~26 and p. 3 line 1~4.

*Primary Examiner* — Katherine Mitchell
*Assistant Examiner* — Justin Rephann
(74) *Attorney, Agent, or Firm* — Winston Hsu; Scott Margo

(57) ABSTRACT

A door structure includes a handle whereon an engaging part, a sunken part, and a baffle part disposed nearby the sunken part are formed. The door structure further includes a cover connected to the handle. The cover includes a main body, a hook disposed on a side of the main body, a rib disposed on the side of the main body for installing inside the sunken part, and a protruding part disposed on the side of the main body for blocking the baffle part so as to fix the handle on the cover with the hook and the rib.

7 Claims, 5 Drawing Sheets

(56) References Cited

U.S. PATENT DOCUMENTS

| | | | |
|---|---|---|---|
| 2006/0086054 A1* | 4/2006 | Levesque et al. | 49/506 |
| 2006/0143865 A1* | 7/2006 | Magyar et al. | 16/412 |
| 2006/0197417 A1* | 9/2006 | Chen et al. | 312/223.2 |
| 2007/0210684 A1* | 9/2007 | Lin et al. | 312/223.2 |
| 2009/0134755 A1* | 5/2009 | Lakoduk et al. | 312/326 |
| 2009/0212677 A1* | 8/2009 | Kocak et al. | 312/326 |
| 2010/0244639 A1* | 9/2010 | Chen et al. | 312/223.2 |
| 2011/0096490 A1* | 4/2011 | Sanchez et al. | 361/679.33 |
| 2012/0200213 A1* | 8/2012 | Savage et al. | 312/326 |
| 2012/0262042 A1* | 10/2012 | Chen et al. | 312/329 |

* cited by examiner

DOOR STRUCTURE WITH EASY ASSEMBLY

BACKGROUND OF THE INVENTION

1. Field of the Invention

The present invention relates to a door structure, and more specifically, to a door structure with easy assembly and low assembly cost.

2. Description of the Prior Art

People have to take apart computers when replacing broken components or upgrading instruments inside the computer. So computers capable of being disassembled easily are necessary. For example, as for mechanical design of a home server, a door structure is often installed in front of a casing of the home server for covering and protecting connector slots on the casing or for maintaining aesthetic feeling of outward appearance. For enhancing combination strength of a cover and a handle of the door structure, the handle and cover are often combined with glue or other tools so as to increase cost and complexity of assembly. There is a problem of overflowing or hardened glue as gluing the handle with the cover. It is an important issue to design a door structure with easy assembly and low assembly cost for mechanical design of a computer casing.

SUMMARY OF THE INVENTION

The present invention provides a door structure with easy assembly and low assembly cost to solve the problems mentioned above.

According to the claimed invention, a door structure includes a handle whereon an engaging part, a sunken part, and a baffle part disposed nearby the sunken part are formed. The door structure further includes a cover connected to the handle. The cover includes a main body, a hook disposed on a side of the main body, a rib disposed on the side of the main body for installing inside the sunken part, and a protruding part disposed on the side of the main body for blocking the baffle part so as to fix the handle on the cover with the hook and the rib.

According to the claimed invention, the hook is engaged inside the engaging part so as to constrain movement of the handle along a planar direction of the main body.

According to the claimed invention, a protrusion is formed on an inner wall of the sunken part for contacting against the rib so that the rib is installed inside the sunken part in a tight fit manner.

According to the claimed invention, the rib is installed inside the sunken part in the tight fit manner so as to constrain movement of the handle along a normal direction of the main body.

According to the claimed invention, the protruding part blocks the baffle part so as to constrain axial movement of the handle relative to the main body.

According to the claimed invention, a slot is formed on an end of the handle, and the cover further includes a pin for inserting into the slot on the handle.

According to the claimed invention, the pin of the cover is inserted into the slot on the handle so as to constrain axial movement of the handle relative to the main body.

According to the claimed invention, a protrusion is formed on the hook for contacting against an inner wall of the engaging part as the hook is engaged inside the engaging part.

According to the claimed invention, the protruding part is a wedge-shaped structure.

According to the claimed invention, the main body, the hook, the rib and the protruding part are monolithically integrated.

These and other objectives of the present invention will no doubt become obvious to those of ordinary skill in the art after reading the following detailed description of the embodiment that is illustrated in the various figures and drawings.

DETAILED DESCRIPTION

Figure 1:
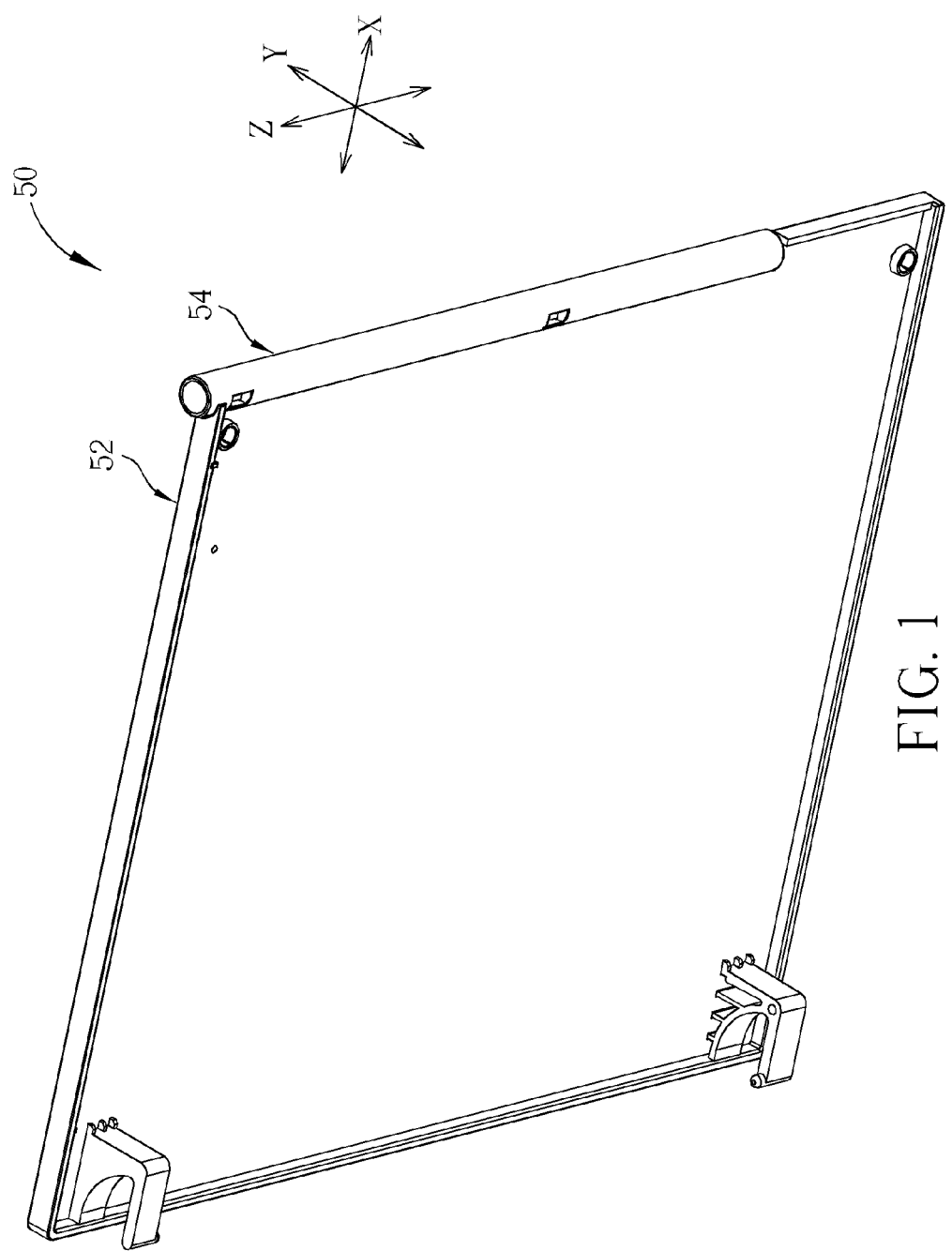
FIG. 1 is a schematic drawing of a door structure according to an embodiment of the present invention.
Figure 2:
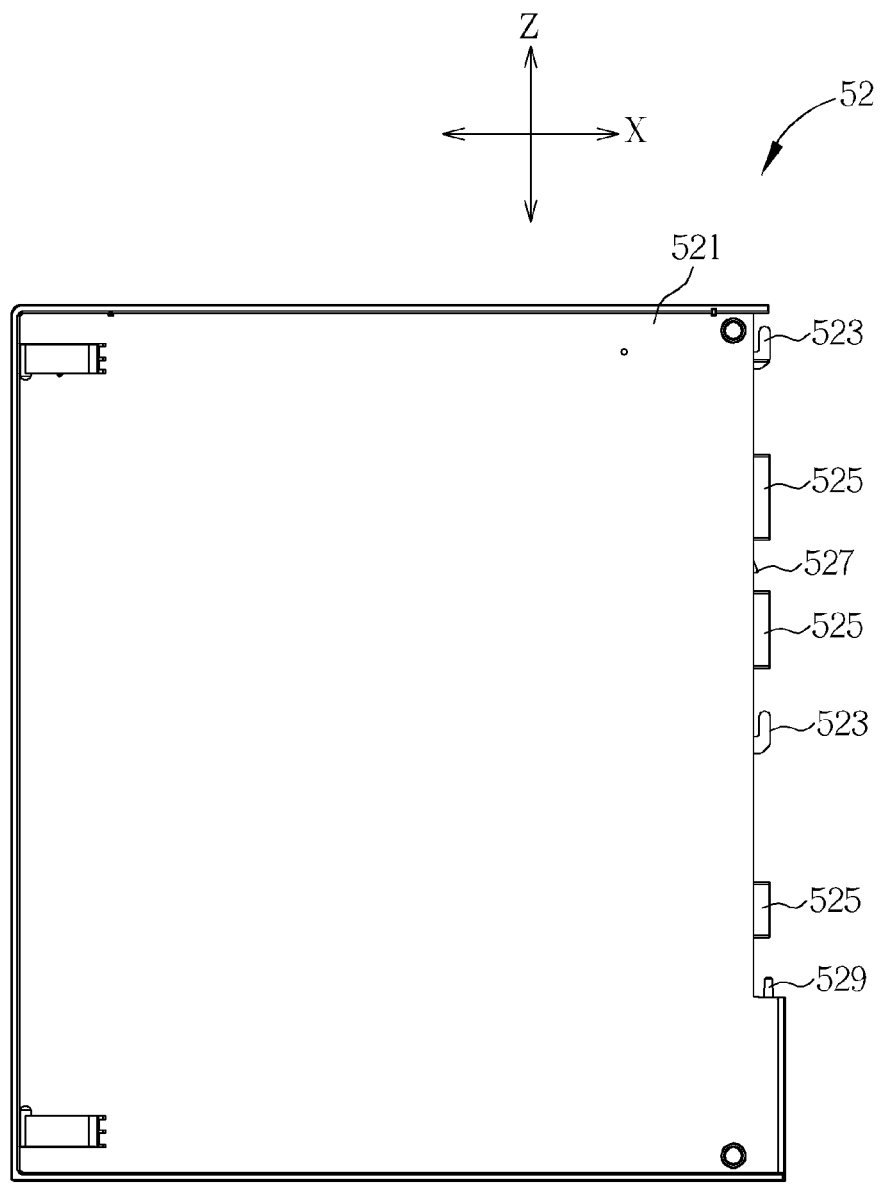
FIG. 2 is a schematic drawing of a cover according to the embodiment of the present invention.
Figure 3:
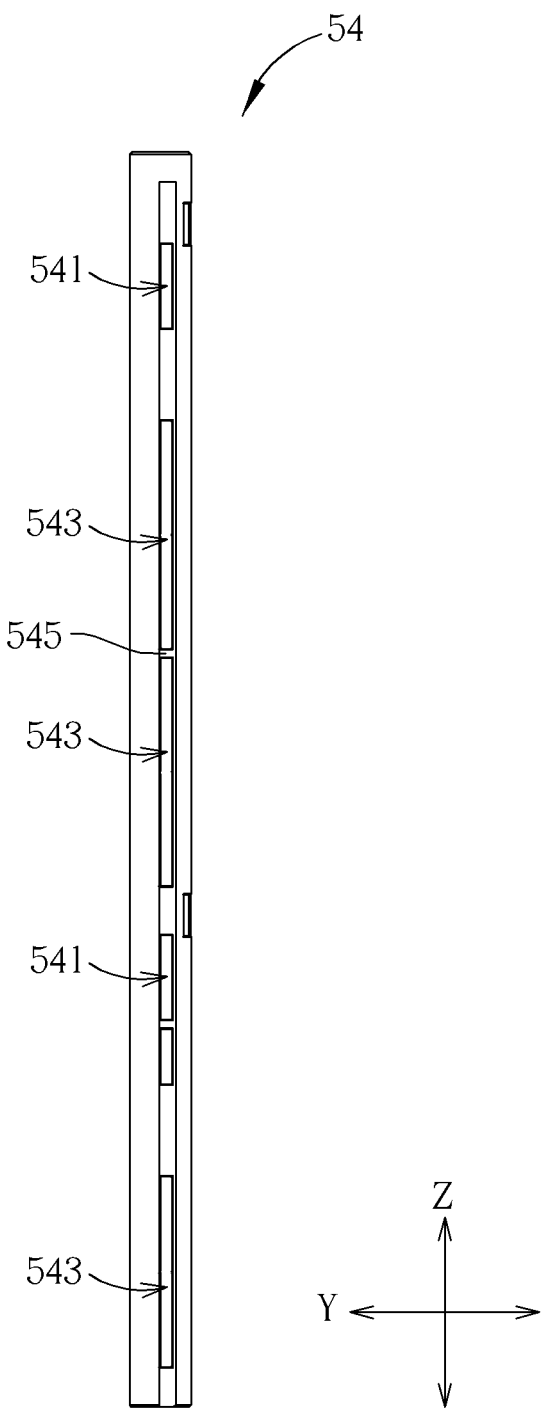
FIG. 3 and FIG. 4 are respectively a schematic drawing and a sectional diagram of a handle according to the embodiment of the present invention.
Figure 4:
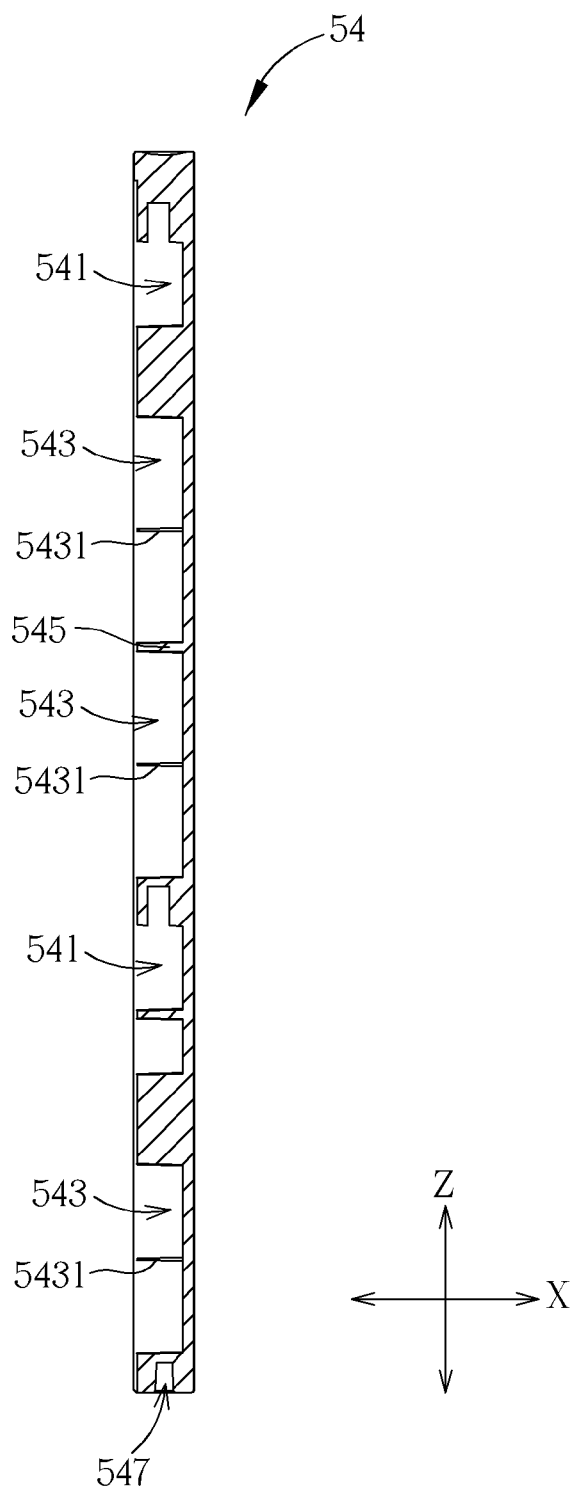
Figure 5:
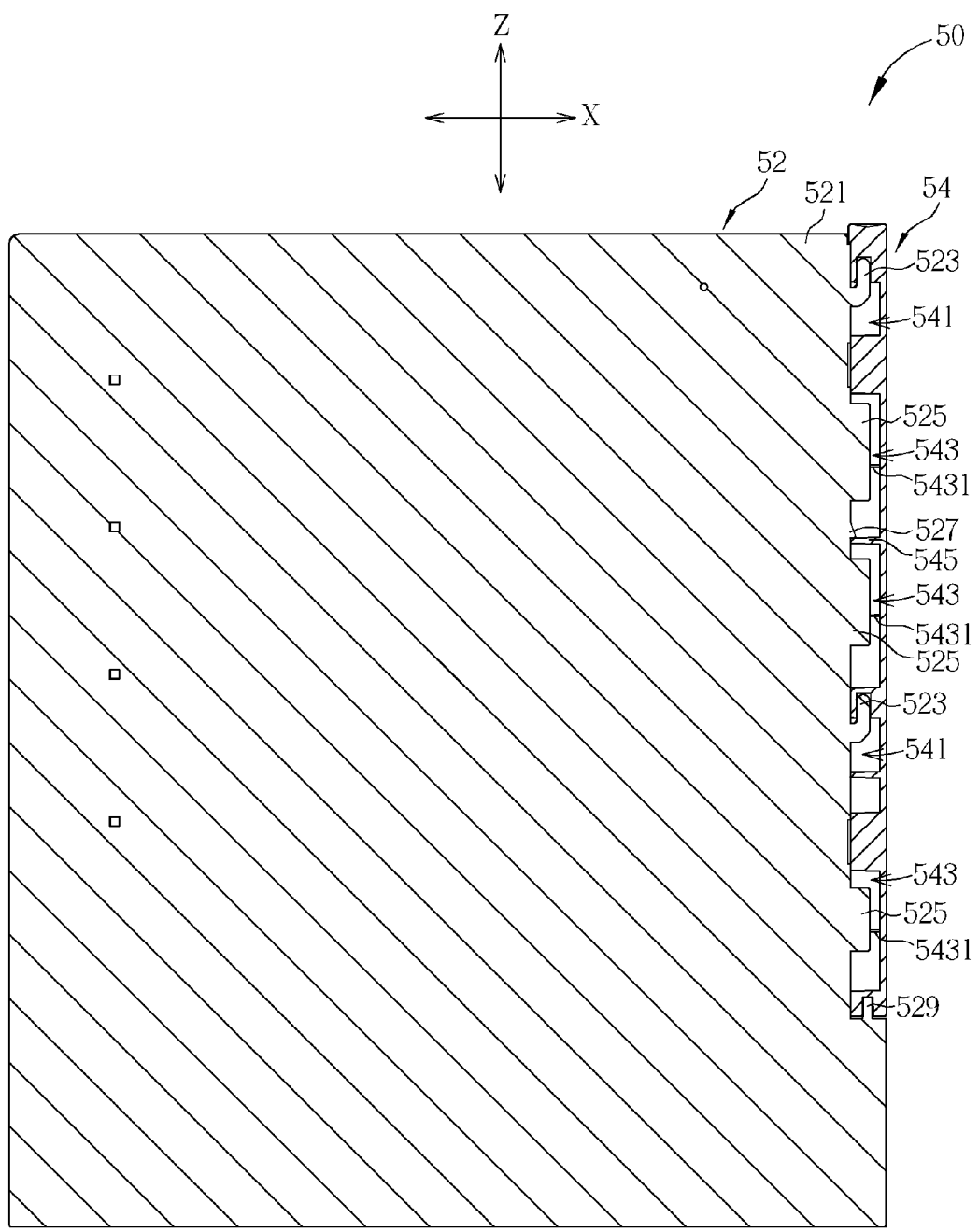
FIG. 5 is a sectional diagram of combination of the cover and the handle according to the embodiment of the present invention.

Please refer to FIG. 1. FIG. 1 is a schematic drawing of a door structure 50 according to an embodiment of the present invention. The door structure 50 can be installed on a casing of a server, such as a home server. The door structure 50 includes a cover 52, and a handle 54 installed on a side of the cover 52 where a user can hold to pull or push the cover 52. Please refer to FIG. 2 to FIG. 5. FIG. 2 is a schematic drawing of the cover 52 according to the embodiment of the present invention. FIG. 3 and FIG. 4 are respectively a schematic drawing and a sectional diagram of the handle 54 according to the embodiment of the present invention. FIG. 5 is a sectional diagram of combination of the cover 52 and the handle 54 according to the embodiment of the present invention. The cover 52 includes a main body 521, at least one hook 523, at least one rib 525, at least one protruding part 527 and a pin 529. The main body 521 can be a planar structure. The hook 523 can be an L-shaped hook and disposed on a side of the main body 521. In this embodiment, the cover 52 includes the two hooks 523. The disposal and the amount of the hooks 523 are not limited to those in this embodiment, and it depends on actual design demand.

The rib 525 is disposed on the side of the main body 521. In this embodiment, the cover 52 includes the three ribs 525. The disposal and the amount of the ribs 525 are not limited to those in this embodiment, and it depends on actual design demand. The protruding part 527 is disposed on the side of the main body 521 and can be a wedge-shaped structure. The pin 529 is disposed on the side of the main body 521 and located corresponding to an end of the handle 54. The main body 521, the hook 523, the rib 525, the protruding part 527 and the pin 529 can be monolithically integrated.

Furthermore, at least one engaging part 541, at least one sunken part 543, and a baffle part 545 disposed nearby the sunken part 543 are formed on the handle 54. A slot 547 is formed on an end of the handle 54. In this embodiment, the two engaging part 541, the three sunken part 543, the single baffle part 545 and the single slot 547 are formed on the handle 54 corresponding to the two hooks 523, the three ribs 525, the single protruding part 527 and the single pin 529 of the cover 52. However, the disposal and the amount of the above-mentioned components are not limited to those in this embodiment, and it depends on actual design demand.

The assembly of the handle 54 and cover 52 is introduced in detail as follows. The engaging part 541, the sunken part 543, the baffle part 545 and the slot 547 of the handle 54 can be respectively aligned with the hook 523, the rib 525, the protruding part 527 and the pin 529 of the cover 52 correspondingly. Then the hook 523 is engaged inside the engaging part 541, the rib 525 is installed inside the sunken part 543, and the pin 529 is inserted into the slot 547. At the same time, the protruding part 527 blocks the baffle part 545 so as to fix the handle 54 on the cover 52 with the hook 523, the rib 525 and the pin 529.

As the hook 523 is engaged inside the engaging part 541, the combination of the hook 523 and the engaging part 541 can constrain movement of the handle 54 along a planar direction (X direction) of the main body 521. A protrusion can be disposed on the hook 523 selectively for contacting against an inner wall of the engaging part 541 as the hook 523 is engaged inside the engaging part 541, so that the hook 523 is engaged inside the engaging part 541 in a tight fit manner, for constraining movement of the handle 54 along the planar direction (X direction) of the main body 521 stably. In addition, at least one protrusion 5431 is formed on an inner wall of the sunken part 543 for contacting against the rib 525 as the rib 525 is installed inside the sunken part 543, so that the rib 525 is installed inside the sunken part 543 in a tight fit manner, for constraining movement of the handle 54 along a normal direction (Y direction) of the main body 541.

The protruding part 527 of the cover 52 can block the baffle part 545 of the handle 54 so as to constrain axial movement of the handle 54 in Z direction relative to the main body 521. Besides, the pin 529 of the cover 52 can be inserted into the slot 547 on the handle 54 so as to constrain axial movement of the handle 54 in Z direction relative to the main body 521. In conclusion, the combinations of the hook 523 and the engaging part 541, the rib 525 and the sunken part 543, the protruding part 527 and the baffle part 545, and the pin 529 and the slot 547 can effectively fix the handle 54 on the cover 52 in three dimensions, without using any tool and manufacturing process for assembly and disassembly of the door structure 50.

In contrast to the prior art, the door structure of the present invention utilizes the structural components, such as the hook, to combine the handle with the cover. It solves the conventional problem of overflowing or hardened glue as gluing the handle with the cover of the conventional door structure, and it also provides the door structure with easy assembly and low assembly cost in the present invention.

Those skilled in the art will readily observe that numerous modifications and alterations of the device and method may be made while retaining the teachings of the invention.

What is claimed is:

1. A door structure installed on a computer casing, the door structure comprising:
    a handle whereon an engaging part, a sunken part, and a baffle part disposed nearby the sunken part are formed; and
    a cover connected to the handle, the cover comprising:
        a main body;
        a hook disposed on a side of the main body and engaged inside the engaging part to constrain movement of the handle along a planar direction of the main body;
        a rib disposed on the side of the main body and installed inside the sunken part, a protrusion being formed on an inner wall of the sunken part and protruding along a normal direction of the main body, the protrusion contacting against the rib to constrain movement of the handle along the normal direction of the main body; and
        a protruding part disposed on the side of the main body and protruding along the planar direction of the main body for blocking the baffle part so as to fix the handle on the cover with the hook and the rib.

2. The door structure of claim 1, wherein the protruding part blocks the baffle part so as to constrain axial movement of the handle relative to the main body.

3. The door structure of claim 1, wherein a slot is formed on an end of the handle, and the cover further comprises a pin inserted into the slot on the handle.

4. The door structure of claim 3, wherein the pin of the cover is inserted into the slot on the handle so as to constrain axial movement of the handle relative to the main body.

5. The door structure of claim 1, wherein a protrusion is formed on the hook and protruding along the normal direction of the main body for contacting against an inner wall of the engaging part as the hook is engaged inside the engaging part.

6. The door structure of claim 1, wherein the protruding part is a wedge-shaped structure.

7. The door structure of claim 1, wherein the main body, the hook, the rib and the protruding part are monolithically integrated.

* * * * *